(12) United States Patent
Diao et al.

(10) Patent No.: US 10,353,232 B2
(45) Date of Patent: Jul. 16, 2019

(54) OPTICAL FILM

(71) Applicant: Sichuan Longhua Film Co., Ltd, Mianyang, Sichuan (CN)

(72) Inventors: Rui-Min Diao, Sichuan (CN); Yi-Ping Hsieh, Zhudong Township, Hsinchu County (TW)

(73) Assignee: Sichuan Longhua Film Co., Ltd, Mianyang (CN)

( * ) Notice: Subject to any disclaimer, the term of this patent is extended or adjusted under 35 U.S.C. 154(b) by 0 days.

(21) Appl. No.: 15/824,077

(22) Filed: Nov. 28, 2017

(65) Prior Publication Data
US 2018/0210273 A1    Jul. 26, 2018

(30) Foreign Application Priority Data
Jan. 20, 2017  (CN) .......................... 2017 1 0045046

(51) Int. Cl.
| | | |
|---|---|---|
| G02B 27/00 | (2006.01) | |
| G02F 1/1335 | (2006.01) | |
| G02B 1/11 | (2015.01) | |
| G09F 27/00 | (2006.01) | |
| G02B 5/02 | (2006.01) | |
| H01L 51/52 | (2006.01) | |

(52) U.S. Cl.
CPC .......... *G02F 1/133502* (2013.01); *G02B 1/11* (2013.01); *G02B 5/021* (2013.01); *G02B 5/0294* (2013.01); *G09F 27/008* (2013.01); *H01L 51/5281* (2013.01)

(58) Field of Classification Search
CPC ... G02B 1/11; G02B 3/0006; G02F 1/133502; B60J 3/02
USPC .................................................. 359/613, 619
See application file for complete search history.

(56) References Cited

FOREIGN PATENT DOCUMENTS

JP     2004117923 A  *  4/2004

* cited by examiner

*Primary Examiner* — William Choi

(57) ABSTRACT

An optical film includes a plane and a plurality of dents. The plane has a normal, and the dents are formed on the plane. Each of the dents is asymmetric relative to the normal, wherein each of the dents includes an opening, and the maximum aperture of each of the dents is the caliber of the opening.

14 Claims, 2 Drawing Sheets

OPTICAL FILM

FIELD OF THE INVENTION

The invention relates to an optical film, and more particularly to an optical film comprising a plurality of dents on its surface.

BACKGROUND OF THE INVENTION

Existing displays, such as liquid crystal displays (LCDs), are prevalent in televisions, computers, and mobile devices such as smartphones and tablets. Through the display, the user may operate the computer and mobile devices and watch the TV films. However, some displays tend to reflect light, especially touch screens of some mobile devices, so that these mobile devices are easy to reflect bright lights such as sunlight outdoors. This may cause the user's eyes to be stimulated by the light so that the user cannot see the image displayed on the screen, thus interfering with the user's operation of the mobile device.

SUMMARY OF THE INVENTION

The invention provides an optical film, which causes the light not to be reflected collectively, and part of the light is not reflected.

The invention provides an optical film, which includes a plane, comprising a normal; and a plurality of dents, forming on the plane, each of the dents is asymmetric relative to the normal, wherein each of the dents comprises an opening and a maximum aperture of each of the dents is the caliber of the opening.

In one embodiment of the invention, each of the dents further includes an axis, and the axis is not coaxial with the normal.

In one embodiment of the invention, an angle between the axis of one of the dents and the normal is ranged between 15 degrees to 45 degrees.

In one embodiment of the invention, each of the dents further comprises a bottom, and the aperture of each of the dents is decreased from the opening toward the bottom.

In one embodiment of the invention, the optical film is transparent or translucent.

In one embodiment of the invention, a total area of the openings is 50% or more than 50% of the area of the plane.

In one embodiment of the invention, the dents are regularly arranged on the plane.

In one embodiment of the invention, the dents are irregularly arranged on the plane.

In one embodiment of the invention, the optical film is a diffuser or a phase retarder.

In one embodiment of the invention, a maximum value of an aperture of each of the dents is greater than 1 μm.

In one embodiment of the invention, at least two of the openings are different in shape.

In one embodiment of the invention, the openings are identical in shape.

In one embodiment of the invention, at least two of the openings are different in area.

In one embodiment of the invention, the openings are identical in area.

In one embodiment of the invention, the axes extend toward an identical direction.

Accordingly, the optical film of the present invention is capable of causing the light not to be reflected collectively and not reflected by the concave portion having the asymmetric structure described above, so that the optical film of the present invention may effectively reduce the intensity of the light reflected by the mobile device to help the user to see the image of the screen more clearly, and thus improving the operation of the mobile device.

The foregoing description is merely an overview of the technical solution of the present invention. To enable a clearer understanding of the technical means of the present invention, and thus it can be implemented in accordance with the teachings of the present invention, and to enable the above features and advantages of the present invention to be more clearly understood, the embodiments are described in detail with reference to the accompanying drawings.

DETAILED DESCRIPTION OF PREFERRED EMBODIMENTS

Figure 1A:
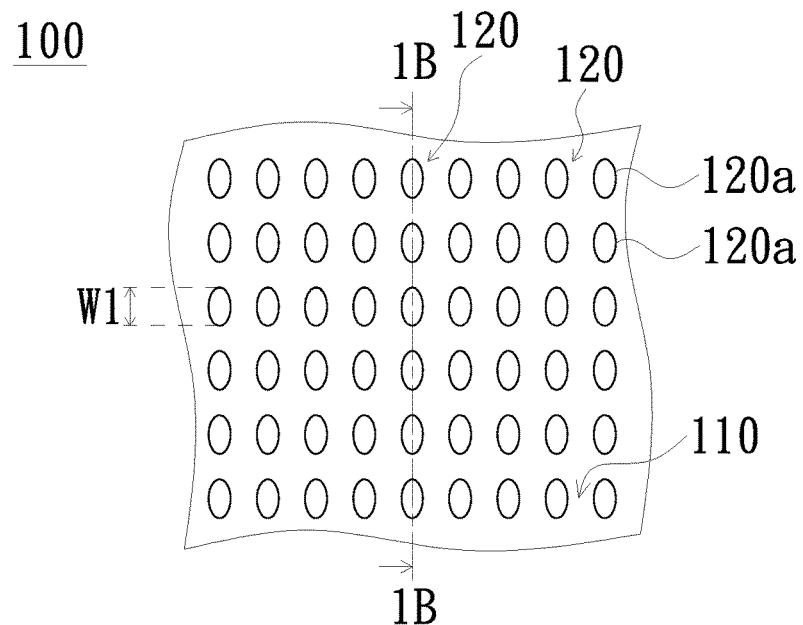
FIG. 1A is a schematic plan view of an optical film according to an embodiment of the present invention.
Figure 1B:
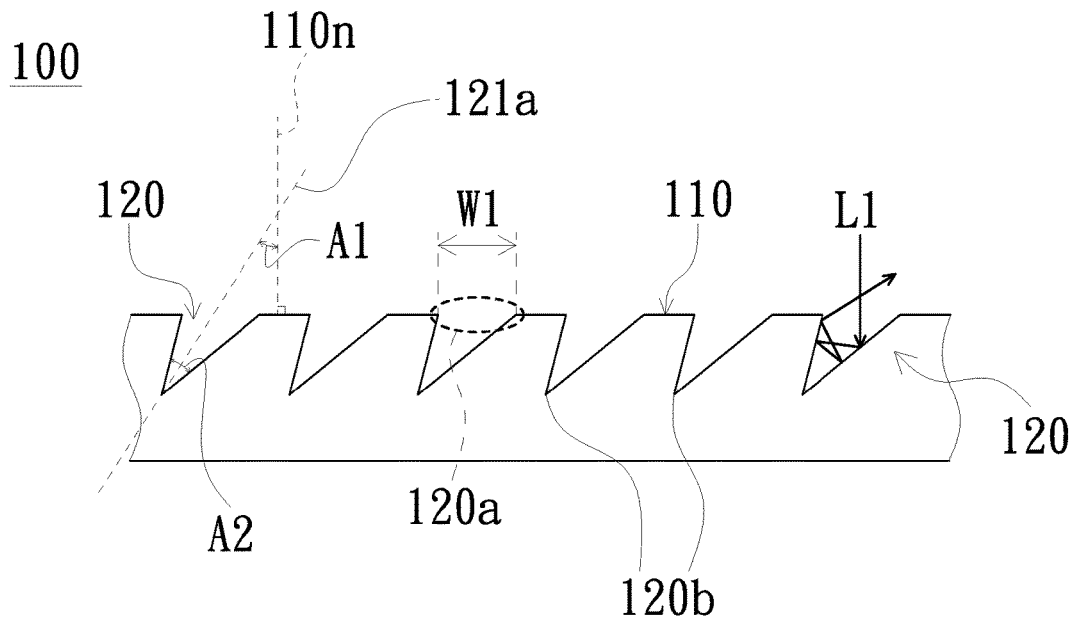
FIG. 1B is a schematic cross-sectional view taken along line 1B-1B of FIG. 1A.

FIG. 1A is a schematic plan view of an optical film according to an embodiment of the present invention, and FIG. 1B is a schematic cross-sectional view taken along line 1B-1B of FIG. 1A. Referring to FIGS. 1A and 1B, the optical film 100 may be transparent or translucent, and may be a diffuser or a phase retarder, such as a half-wave plate or a quarter-wave plate. The optical film 100 includes a plane 110 and a plurality of dents 120, which are formed on the surface of the plane 110 and may be made by machining, such as rolling. For example, the dents 120 may be directly formed on a film (such as a quarter-wave plate) by mechanical processing. Alternatively, a coating may be applied to the above-mentioned film. The coating is then machined, and the machining may include the use of a die to be embossed to form the dents 120 on the coating. In addition, the depth D1 of each dent 120 may be between 3 μm to 15 μm.

Each of the dents 120 has an opening 120a, which is exposed to the plane 110. Referring to FIG. 1A, the openings 120a are of the same shape and area as each other, and the shape of the respective openings 120a is an oval. However, in other embodiments, the openings 120a may be circular in shape and the areas of at least two openings 120a may be different from each other. These openings 120a, located on the plane 110, are arranged in an array, that is, these dents 120 are regularly arranged on the plane 110. Except for those shown in FIG. 1A, the dents 120 on the plane 110 may also be arranged in a way as a honeycomb, so that the regularly arranged manner is not limited to the array as shown in FIG. 1A. In addition, the total area of these openings 120a is 50% or more of the area of the plane 110, for example, more than 70% or 80%, and the area of the plane 110 described herein also covers the areas of all openings 120a. Thus, these openings 120a actually occupy more than half of the plane 110. In addition, through the design to these dents 120, the haze of the optical film 100 may be more than 10%, or even up to 50%.

Each dent 120's maximum aperture W1 is the caliber of the opening 120a. In FIG. 1B, for example, each dent 120 further comprises a bottom 120b, and the aperture of each dent 120 may be decreased from the opening 120a toward the bottom 120b. In addition, the dent 120's maximum aperture W1 will be greater than 1 µm, so the optical interference generated by a single dent 120 is not easy to be perceived by the human eye.

The plane 110 includes a normal 110n, and each of the dents 120 is asymmetric relative to the normal 110n. In particular, each dent 120 also has an axis 121a in which the axis 121a shown in FIG. 1B is equal to an angle bisector of the angle A2 of the bottom 120b. As shown in FIG. 1B, these axes 121a extend in the same direction, and the axis 121a and the normal 110n are not parallel to each other, i.e., the axis 121a is not coaxial with the normal 110n, so that each dent 120 is asymmetric relative to the normal 110n. In addition, in the present embodiment, the angle A1 between the axis 121a and the normal 110n may be ranged between 15 degrees and 45 degrees.

Since the total area of these openings 120a is 50% or more of the area of the plane 110, the light L1 is easily incident on the dents 120 when the light L1 is incident on the plane 110. Deflection and scattering of each light reflected in the dent 120 will prevent the light L1 from being reflected collectively. As shown in FIG. 1B, for example, after the light L1 is incident on one of the dents 120 along the normal 110n, the side walls of the dent 120 reflect the light L1 a plurality of times so that the light L1 is reflected from the plane 110 alone a direction away from the normal 110n.

In addition, after the light L1 is reflected by the side walls of the dent 120 a plurality of times, the energy of the light L1 is greatly attenuated. In the present embodiment, after the light L1 is reflected by the optical film 100 times, according to Fresnel equations, if the refractive index of the film is 1.5, the energy of the light L1 is attenuated to about 4% of the original energy, and the light L1 shown in FIG. 1B is reflected four times by the dent 120 before leaving the optical film 100. Therefore, the energy of the light L1 emitted from the optical film 100 is about 0.00265% of the energy of the light L1 originally incident on the optical film 100. The light L1 emitted from the optical film 100 after repeated reflection has been largely attenuated in energy and thus may even be ignored, so that even if the light L1 is incident on the human eye, the user does not feel dazzling at all.

Figure 1C:
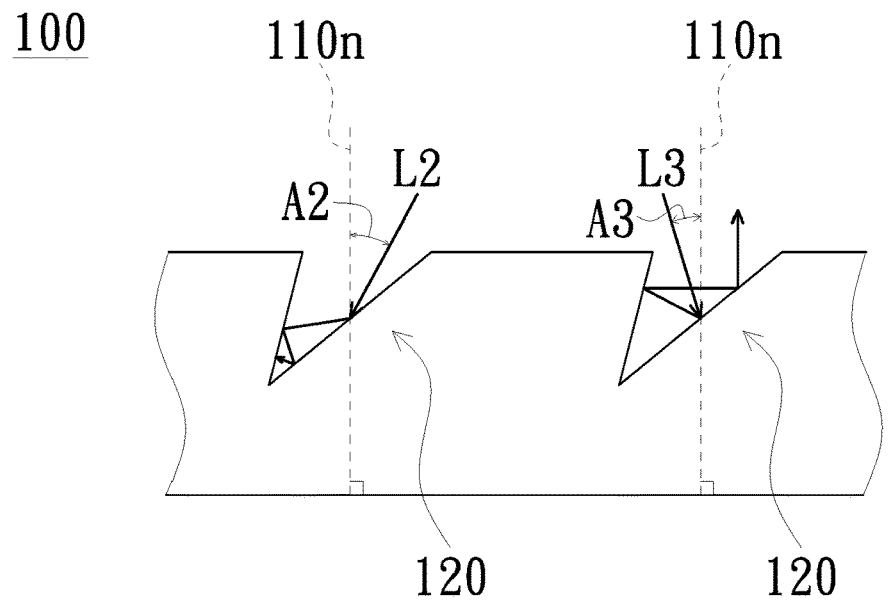
FIG. 1C is a schematic cross-sectional view of the optical film with different incident light incident on the optical film of FIG. 1B.

Referring to FIG. 1C, which illustrates the case where the lights L2 and L3 along the different incident angles A2 and A3 are incident on the optical film 100, wherein the incident directions of the lights L2 and L3 are not parallel to normal 110n, and the incident angle A2 of the light L2 is larger than the incident angle A3 of the light L3. The light L2 is incident on the side walls of one of the dents 120 along the incident angle A2. After that, the light L2 in the dent 120 is reflected multiple times, and then approaches into the bottom of the dent 120. From FIG. 1C, it may be seen that the light L2 in dent 120 is reflected at least four times, and then is delivered into the bottom of the dent 120. Since the energy of the light L2 which has been reflected four times has been greatly attenuated, even if the light L2 is finally left out of the dent 120 and is emitted, the light L2 is difficult to be perceived by the human eye and can be regarded as disappearing because of the substantial attenuation of the energy.

The light L3 is incident on the side walls of the other dent 120 along the incident angle A3. Since the incident angle A2 is larger than the incident angle A3, the light L3 is incident on the dent 120 in a direction closer to normal 110n. From FIG. 1C, the light L3 is emitted after three reflections in the dent 120, so that the energy of the outgoing light L3 is about 0.0064% of the energy of the light L3 previously incident on the optical film 100. Therefore, even if the light L3 after repeated reflection is emitted in the direction close to normal 110n, the energy of the light L3 has been greatly attenuated and it is difficult to stimulate the user's eyes, and may even be ignored by the user Based on the above statement, the optical film 100 may be applied to a display since the optical film 100 may prevent the light (for example, the light L1 shown in FIG. 1B) from being reflected collectively and attenuate the emitted light. For example, the optical film 100 may be attached to a touch screen of a mobile device or disposed between a display panel (e.g., a liquid crystal display panel) and a polarizer, or disposed on a polarizer to diverge the light, to avoid reflection of the light focused on the user's eyes. As such, the optical film 100 may help the user to reduce the interference of the light reflection when using the mobile device outdoors.

Figure 2:
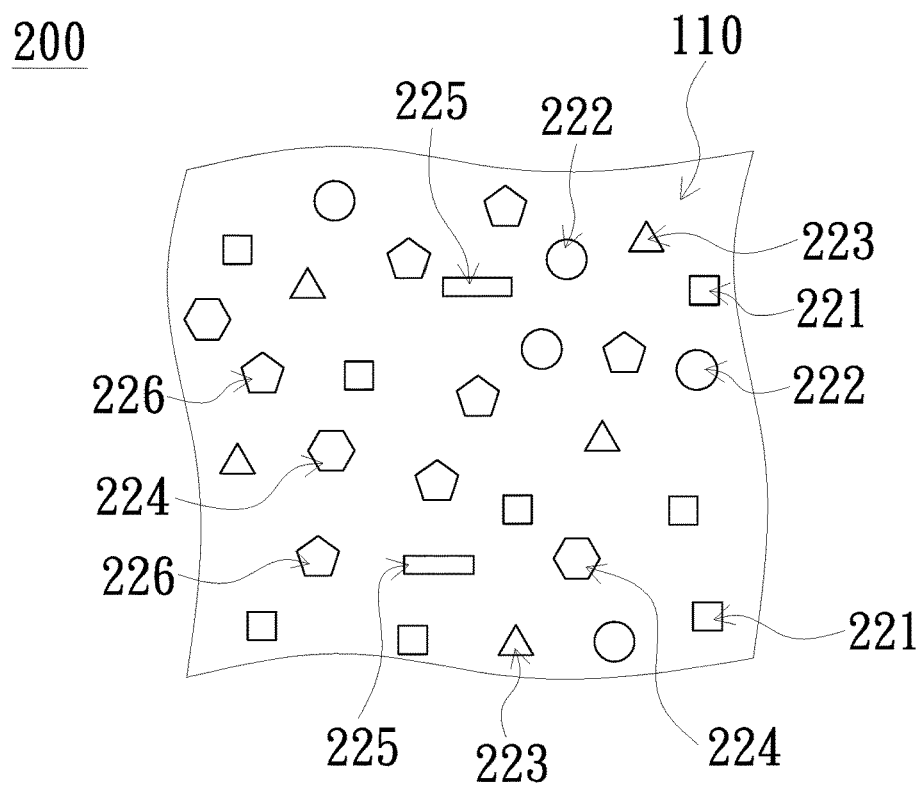
FIG. 2 is a schematic plan view of an optical film according to another embodiment of the present invention.

FIG. 2 is a schematic plan view of an optical film according to an embodiment of the present invention. Referring to FIG. 2, the optical film 200 of the present embodiment is similar in structure to the optical film 100 of the foregoing embodiment, and has the same function and effects. For example, the optical film 200 also includes a plane 110 and a plurality of dents 221 to 226, and the optical films 100 and 200 have the same cross-sectional structure as shown in FIG. 1B. However, unlike the optical film 100, in the optical film 200, the dents 221 to 226 on the plane 110 are irregularly arranged, as shown in FIG. 2.

Since these dents 221 to 226 are irregularly arranged on the plane 110, as compared to the dents 120 shown in FIG. 1A, the total optical interference generated by all dents 221 to 226 may be more effectively reduced. Thus, when the optical film 200 is applied to the display, these dents 221 to 226 do not produce significant diffraction, so as not to damage the quality of the display screen.

In the optical film 200, at least two of the openings of these dents 221 to 226 have different shapes and areas from each other. For example, according to the embodiment shown in FIG. 2, the dent 221 has an opening shape of square; the dent 222's opening shape is round; the dent 223 has an opening shape of triangle; the dent 224 has an opening in a hexagonal shape; the dent 225 has an opening in a rectangular shape; and the dent 226 has an opening in a pentagonal shape. In addition, in various other embodiments, the optical film 200 may also include a dent 120 having an oval opening 120a, and the optical film 200 may include only a single opening shape, for example, the optical film 200 may only includes the dent 120, or any one of the dents 221 to 226. Other possible opening shapes may include but not limited to oval shapes, polygon shapes, or even irregular shapes.

It is worth mentioning that at least one of the dents 120 in FIG. 1A may be replaced by one of the dents 221 to 226 in FIG. 2. For example, in the optical film 100 shown in FIG. 1A, at least one of the dents 120 may be replaced by any one of the dents 221 to 226. Alternatively, all of the dents 120 of the optical film 100 may be replaced by the same dent having the same opening shape and area (any one of the dents 221 to 226). For example, the optical film 100 may include a plurality of dents 221 having regularly arranged openings with same shape and area. In addition, whether in the optical film 100 or 200, the dents 120 or 221 to 226 shown in FIG. 1A and FIG. 2 are illustrative only and do not limit the types of dents included in the optical films 100 and 200.

In view of the above, the optical films disclosed in the above embodiments enable the light to be not reflected collectively and not reflected using dents having an asymmetric structure. Accordingly, when the optical film is applied to the display, the optical film may diffuse the reflected light to avoid the light reflected by the display from being concentrated in the user's eyes. When the user operates the mobile device outdoors, the optical film of the present invention may effectively reduce the intensity of the light reflected by the mobile device and help the user to see the image of the screen more clearly, thereby improving the operation of the mobile device.

The foregoing is merely illustrative of the embodiments of the present invention and is not intended to be limiting of the present invention. While the invention has been disclosed by way of example, it is not intended to be limiting of the invention. It is to be understood that within the scope of the technical solutions of the present invention, the equivalent embodiments of the present invention may be modified and modified to be equivalent to those skilled in the art without departing from the scope of the technical solutions of the present invention. Any simple modifications, equivalent variations and modifications of the embodiments are within the scope of the technical solutions of the present invention.

What is claimed is:

1. An optical film, comprising:
   a plane, comprising a normal; and
   a plurality of dents, forming on the plane, each of the dents being asymmetric relative to the normal, wherein each of the dents comprises an opening, an axis and a bottom, and a maximum value of an aperture of each of the dents is a caliber of the opening, the axis is not coaxial with the normal, and the orthographic projection of the bottom on the plane is near the opening and does not overlap the opening, to enable the light incident into the dents to be not reflected collectively and not reflected to the user's eye.

2. The optical film according to claim 1, wherein an angle between the axis of one of the dents and the normal is ranged between 15 degrees to 45 degrees.

3. The optical film according to claim 1, wherein the aperture of each of the dents is decreased from the opening to the bottom.

4. The optical film according to claim 1, wherein the optical film is transparent or translucent.

5. The optical film according to claim 1, wherein a total area of the openings is 50% or more than 50% of an area of the plane.

6. The optical film according to claim 1, wherein the dents are regularly arranged on the plane.

7. The optical film according to claim 1, wherein the dents are irregularly arranged on the plane.

8. The optical film according to claim 1, wherein the optical film is a diffuser or a phase retarder.

9. The optical film according to claim 1, wherein the maximum value of the aperture of each of the dents is greater than 1 µm.

10. The optical film according to claim 1, wherein at least two of the openings are different in shape.

11. The optical film according to claim 1, wherein the openings are identical in shape.

12. The optical film according to claim 1, wherein at least two of the openings are different in area.

13. The optical film according to claim 1, wherein the openings are identical in area.

14. The optical film according to claim 1, wherein the dents further include axes respectively, and the axes extend toward an identical direction.

* * * * *